H. E. TOWNSEND.
METHOD OF SEALING CLOSURES.
APPLICATION FILED JUNE 13, 1914.
1,154,352.
Patented Sept. 21, 1915.
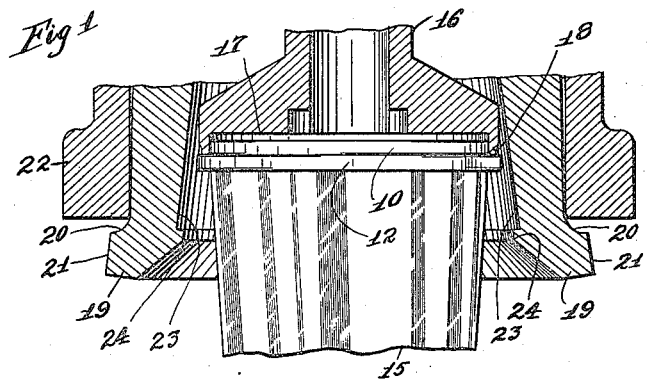
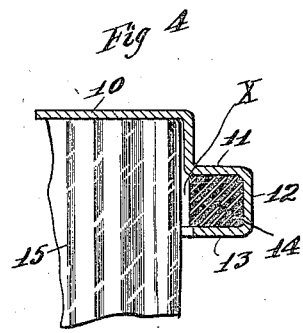
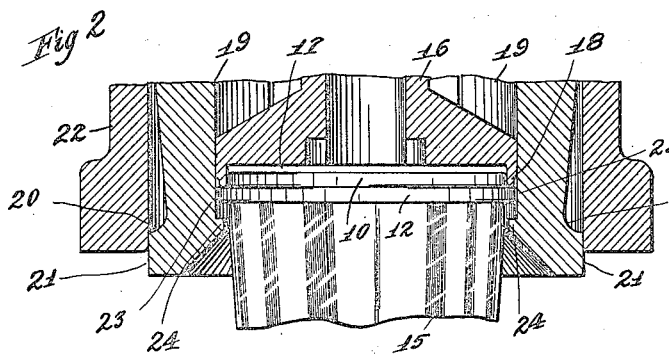
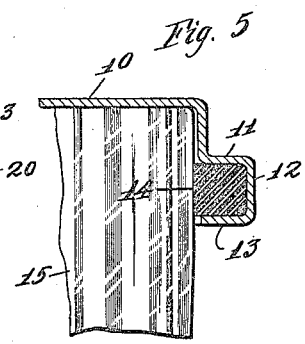
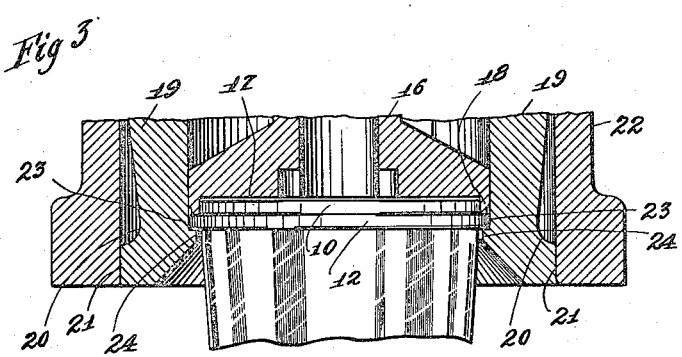
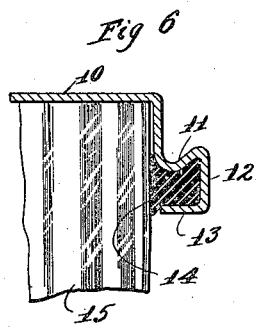
WITNESSES:
HARRY E. TOWNSEND
INVENTOR
BY
Robert Magrane
ATTORNEY

UNITED STATES PATENT OFFICE.

HARRY E. TOWNSEND, OF BROOKLYN, NEW YORK, ASSIGNOR TO ANCHOR CAP & CLOSURE CORPORATION, OF BROOKLYN, NEW YORK, A CORPORATION OF NEW YORK.

METHOD OF SEALING CLOSURES.

1,154,352.  Specification of Letters Patent.  Patented Sept. 21, 1915.

Application filed June 13, 1914. Serial No. 844,887.

*To all whom it may concern:*

Be it known that I, HARRY E. TOWNSEND, a citizen of the United States, residing at Brooklyn, in the county of Kings and State of New York, have invented new and useful Improvements in Methods of Sealing Closures, of which the following is a specification.

My invention relates to an improved method of sealing metallic closures and the like to glass containers and is an improvement on the sealing methods disclosed in the pending applications of Joseph V. Hull, Serial Nos. 682,051 and 825,844, and Patent No. 874,201.

The objects of invention are to increase the efficiency of the seal, particularly when the closure is applied to smooth wall containers such as tumblers, which have no sealing or locking shoulder; to reduce the breakage of glass during the capping operation; and to reduce the cost of the package.

Referring to the drawings: Figure 1 is an elevation partly in section of a glass container and closure, and the sealing mechanism open to receive the container and closure; Fig. 2 is a similar view showing the sealing jaws in their second position; Fig. 3 is a similar view showing the jaws in their third and final position; and Figs. 4, 5 and 6 are sectional views of the closure as it appears after the action of the sealing mechanism as shown in Figs. 1, 2 and 3 respectively.

The closure is somewhat similar in construction to that disclosed in the patent above referred to. It comprises a metallic cap 10 having an annular beading formed by the walls 11, 12 and 13 of the cap, and within this beading is a circular gasket 14 which in the present instance is shown as rectangular in cross-section, though this is not essential. The glass container upon which the closure is to be sealed is indicated at 15.

As indicated in Fig. 4, in which the closure is shown upon the container and before it is sealed thereto, a clearance $x$ between the gasket 14 and the container 15 is provided as usual so that the closure may be placed upon the container with little effort or loss of time. With the method heretofore in use, the closure has then been sealed to the container by applying pressure in a vertical direction to the beading whereby the rubber or gasket material is squeezed laterally from the beading against the wall of the container so that a hermetic seal is secured, as indicated in Fig. 6. It will be noticed that in this sealing method, the pressure has to be applied to the beading not only to cause the gasket to seal against the glass, but also to cause it first to fill the clearance space $x$, so that a relatively large gasket is necessary, as well as a prolonged and powerful pressure, in order to effect a satisfactory seal.

In the practice of my method, the closure is applied to the container in the usual way, as shown in Fig. 4. Pressure is then brought to bear upon the outer wall 12 of the beading in a radial and horizontal direction so that the diameter of the beading is somewhat reduced, the compression of the beading being such as to move the gasket inward until it is in contact with the glass and the clearance space $x$ is taken up, as shown in Fig. 5. With the gasket and beading in this position, vertical pressure is applied to the beading to cause the indirect sealing flow of the gasket material upon the wall of the container 15.

Mechanism adapted to carry out this improved method of sealing is indicated in Figs. 1, 2 and 3, for further operating details of which reference may be made to the patent cited above.

As shown in the figures, a central stationary anvil or abutment 16 forms a part of the machine, this anvil having a circular recess 17 to receive the body of the cap as shown, and a circular sealing bead 18 which contacts with the wall 11 of the closure beading during the operation of sealing. Sectional jaws are indicated at 19, 19. These jaws are provided with cam and cylindrical surfaces 20, 21 which are normally in contact with a stationary annular member 22 which encircles the jaws. The inner surfaces of the jaws are circular and the part indicated at 23 is adapted to contact with the wall 12 of the closure beading, and the shoulders 24 upon the jaws are adapted to contact with the wall 13 of the beading. By mechanism described in the patent referred to, these jaws 19 are drawn upward in the operation of the machine from the position shown in Fig. 1 to that shown in Fig. 3.

In Fig. 1, the container and closure are shown centered upon the anvil 16, and the closure is in the form shown in the corresponding Fig. 4.

In Fig. 2, the jaws 19 have been drawn partly upward, the cam surface 20 operating against the ring 22 has forced the jaws inward so that the jaw surfaces 23, 23 have contacted with the wall 12 of the beading and have compressed it radially. This change in the cap is indicated in Fig. 5.

In Fig. 3, the cylindrical surface 21 of the jaws 19 is in contact with the ring 22 and no further inward movement of the jaws has taken place. They have been free to move upwardly, however, and, as shown in Figs. 2 and 3, they have so moved a sufficient distance to compress the beading vertically so that the gasket material has been forced into close contact with the container wall.

Mechanism adapted to carry out this method of sealing is shown and described in my co-pending application, filed June 13, 1914, Serial No. 844,886.

I claim:

1. The method of sealing a package that has a rigid wall container and a metallic cap equipped with a beading and a gasket adapted to form a seal upon the side wall of the container which consists in placing the cap upon the container, compressing the beading and gasket of the cap radially inward, and then applying pressure to the beading and gasket in a direction at right angles to the radial pressure.

2. The method of sealing a package that has a rigid wall container and a metallic cap equipped with a beading and a gasket adapted to form a seal upon the side wall of the container which consists in placing the cap upon the container, reducing the diameter of the beading and gasket of the cap, and then reducing the vertical thickness of the beading and gasket.

3. The method of sealing a package that has a rigid wall container and a metallic cap equipped with a beading and a gasket adapted to form a seal upon the side wall of the container which consists in placing the cap upon the container, applying pressure horizontally to the beading until the clearance between the inclosed gasket and the container is reduced, and then applying pressure vertically to the beading to cause a radial inward flow of gasket material upon the wall of the container to effect the seal.

HARRY E. TOWNSEND.

Witnesses:
H. R. McLaughlin,
Gertrude McCormack.